US008359054B2

(12) United States Patent
Usuda et al.

(10) Patent No.: US 8,359,054 B2
(45) Date of Patent: *Jan. 22, 2013

(54) TRANSMISSION POWER CONTROL METHOD, AND MOBILE COMMUNICATION SYSTEM

(75) Inventors: Masafumi Usuda, Tokyo (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 630 days.

This patent is subject to a terminal disclaimer.

(21) Appl. No.: 11/508,264

(22) Filed: Aug. 23, 2006

(65) Prior Publication Data

US 2007/0049320 A1    Mar. 1, 2007

(30) Foreign Application Priority Data

Aug. 24, 2005 (JP) .............................. P2005-274648

(51) Int. Cl.
*H04B 7/00* (2006.01)
(52) U.S. Cl. ........ 455/522; 455/517; 455/439; 455/437; 455/69; 370/331
(58) Field of Classification Search .......... 370/328–347, 370/431, 310, 441, 442, 489, 496, 498, 522, 370/505–507; 455/442, 439, 437, 522, 68, 455/69, 450, 452.1, 453, 403, 422.1, 455, 455/39, 500–507
See application file for complete search history.

(56) References Cited

U.S. PATENT DOCUMENTS 6,823,193 B1 *  11/2004  Persson et al. ................. 455/522

| 2002/0115443 | A1 * | 8/2002 | Freiberg et al. | 455/450 |
| 2003/0232622 | A1 * | 12/2003 | Seo et al. | 455/437 |
| 2004/0229641 | A1 * | 11/2004 | Takagi | 455/522 |

(Continued)

FOREIGN PATENT DOCUMENTS

| CN | 1455607 A | 11/2003 |
| EP | 1 341 318 A2 | 9/2003 |

(Continued)

OTHER PUBLICATIONS

3GPP TSG-RAN 2 #47 R2-051398, Source: NTT DoCoMo, Inc., Title: Need for Outer Loop Power Control for E-DPCCH, Agenda Item 12.2, Open Item 3, Document for: Discussion and decision, Athens, Greece, May 9-13, 2005, p. 1-2.

Office action issued on Apr. 29, 2011 in the counterpart Indian patent application.

*Primary Examiner* — Chuong A Ngo
(74) *Attorney, Agent, or Firm* — Marvin A. Motsenbocker; MOTS Law, PLLC

(57) ABSTRACT

A transmission power control method for controlling a transmission power of an E-HICH for uplink user data transmitted from a cell controlled by a radio base station to a mobile station, includes: notifying, from a radio network controller to at least one radio base station controlling a first cell and a second cell, offsets between the transmission power of the E-HICH and a transmission power of a DPCH, when a mobile station is performing a soft-handover with the first and second cell; determining, at the first cell, a transmission power of a first E-HICH based on a notified offset, and transmitting the first E-HICH to the mobile station using the determined transmission power; and determining, at the second cell, transmission power of a second E-HICH based on a notified offset, and transmitting the second E-HICH to the mobile station using the determined transmission power.

4 Claims, 16 Drawing Sheets

U.S. PATENT DOCUMENTS

| | | | |
|---|---|---|---|
| 2005/0043051 A1* | 2/2005 | Takano et al. | 455/522 |
| 2005/0239413 A1* | 10/2005 | Wiberg et al. | 455/69 |
| 2006/0072496 A1* | 4/2006 | Nakamata et al. | 370/328 |
| 2010/0099453 A1* | 4/2010 | Usuda et al. | 455/522 |

FOREIGN PATENT DOCUMENTS

| | | |
|---|---|---|
| JP | 2003-298509 | 10/2003 |
| KR | 2003-68998 | 8/2003 |
| WO | WO-03017525 A1 | 2/2003 |

* cited by examiner

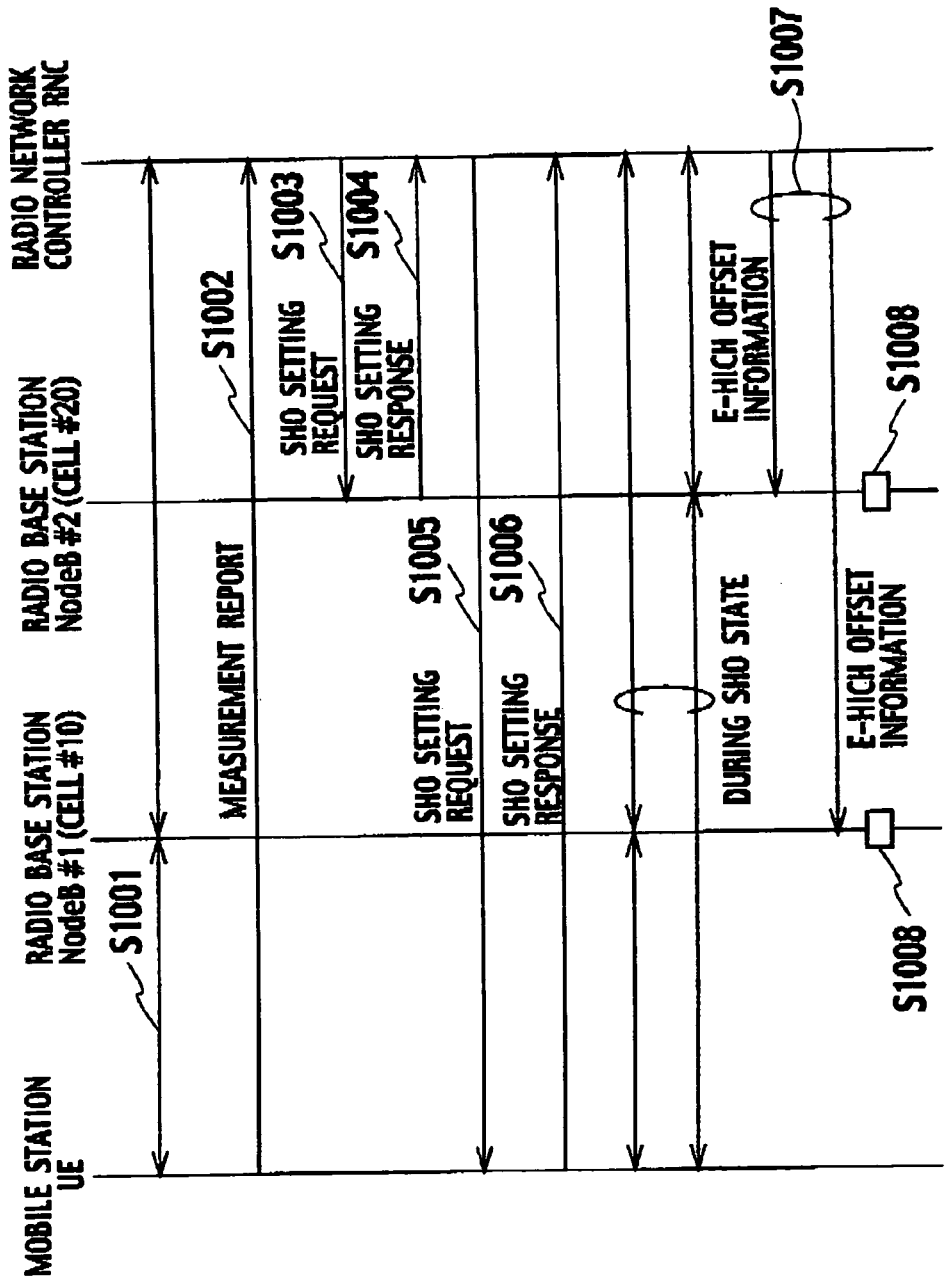

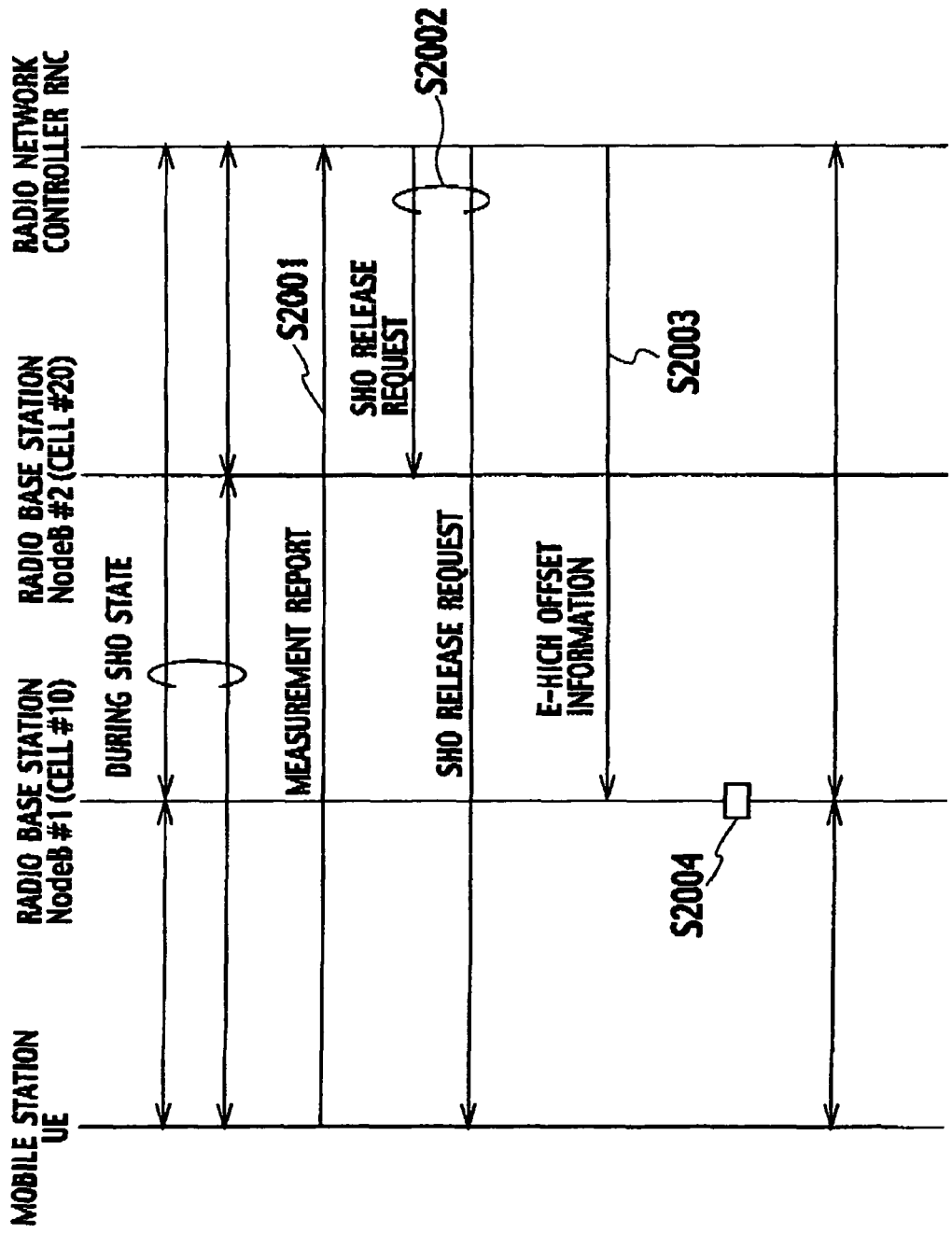

TRANSMISSION POWER CONTROL METHOD, AND MOBILE COMMUNICATION SYSTEM

CROSS REFERENCE TO RELATED APPLICATION

This application is based upon and claims the benefit of priority from the prior Japanese Patent Application No. P2005-274648, filed on Aug. 24, 2005; the entire contents of which are incorporated herein by reference.

BACKGROUND OF THE INVENTION

1. Field of the Invention

The present invention relates to a transmission power control method and a mobile communication system for controlling a transmission power of a transmission acknowledgement channel for uplink user data, which is transmitted from a cell controlled by a radio base station to a mobile station.

2. Description of the Related Art

In a conventional mobile communication system, when setting a Dedicated Physical Channel (DPCH) between a mobile station UE and a radio base station Node B, a radio network controller RNC is configured to determine a transmission rate of uplink user data, in consideration of hardware resources for receiving of the radio base station Node B (hereinafter, hardware resource), a radio resource in an uplink (an interference volume in an uplink), a transmission power of the mobile station UE, a transmission processing performance of the mobile station UE, a transmission rate required for an upper application, or the like, and to notify the determined transmission rate of the uplink user data by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of uplink user data (for example, per approximately 1 through 100 ms), due to the increase of processing load and processing delay in the radio network controller RNC.

In addition, in the conventional mobile communication system, there has been also a problem that costs for implementing an apparatus and for operating a network are substantially increased even if the fast control for changing of the transmission rate of the uplink user data can be performed.

Therefore, in the conventional mobile communication system, control for changing of the transmission rate of the uplink user data is generally performed on the order from a few hundred ms to a few seconds.

Accordingly, in the conventional mobile communication system, when burst data transmission is performed as shown in FIG. 2A, the data are transmitted by accepting low-speed, high-delay, and low-transmission efficiency as shown in FIG. 2B, or, as shown in FIG. 2C, by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2B and 2C.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the uplink radio resources effectively. Such discussions or discussed functions will be hereinafter referred to as "Enhanced Uplink (EUL)".

Referring to FIG. 3, the mobile communication system, to which the "Enhanced Uplink" is applied, is explained.

As shown in an example of FIG. 3, in the mobile communication system, a cell, which is controlled by a radio base station Node B, is configured to transmit an "Enhanced HARQ Acknowledgement Indicator Channel (B-HICH)" which is a transmission acknowledge channel, in order to perform a retransmission control of the uplink user data, i.e., "Hybrid Automatic Repeat Request (HARQ)".

In other words, in the above mobile communication system, the cell, which is controlled by the radio base station Node B, is configured to perform an error detection check ("Cyclic Redundancy Check" CRC) of the uplink user data transmitted via an "Enhanced Dedicated Physical Data Channel (E-DPDCH)", and to notify an "ACK" or a "NACK" to the mobile station UE using the E-HICH, so as to perform the retransmission control of the uplink user data of the mobile station UE.

To be more specific, as shown in FIG. 3, the mobile station UE, which has transmitted an E-DPDCH #1 to a cell #2, is configured to transmit the subsequent E-DPDCH to the cell #2, upon receiving of an E-HICH #1 (ACK) from the cell #2.

On the other hand, the mobile station UE is configured to retransmit the E-DPDCH #1 to the cell #2, upon receiving of the E-HICH (NACK) from the cell #2.

Further, in the above mobile communication system, a closed loop transmission power control using a "Transmit Power Control (TPC) command" is known, as an example of the transmission power control method for a downlink dedicated physical channel (herein after, DPCH) transmitted from the radio base station Node B.

Referring to FIG. 4A, the closed loop transmission power control using the TPC command is described.

As shown in FIG. 4A, the mobile station UE, which has received a downlink DPCH transmitted from the cell #2, is configured to determine the increase/decrease of a transmission power of the downlink DPCH in the cell #2 controlled by the radio base station Node B, based on the transmission power of the received downlink DPCH. Then, the mobile station UE is configured to transmit the determined result of the increase/decrease of the transmission power of the downlink DPCH to the cell #2, using the TPC command (for example, UP command/Down Command).

In addition, the cell #2 is configured to control the transmission power of the downlink DPCH to be transmitted to the mobile station UE, using the TPC command transmitted from the mobile station UE.

In addition, in the above mobile communication system, the cell #2 is configured to determine the transmission power of the E-HICH, based on the transmission power of the downlink DPCH and a predetermined offset (an E-HICH offset).

As described above, in the mobile communication system, the reception power of the downlink DPCH in the mobile station UE will be improved by the transmission power control using the TPC command, and therefore, the reception power of the E-HICH, which depends on the downlink DPCH, will be also improved.

Next, referring to FIG. 4B, the transmission power control using the TPC command in the mobile communication system in which soft-handover (SHO) is performed is described.

In the above mobile communication system, as shown in FIG. 4B, when the mobile station UE is performing the SHO by establishing radio links with the cell #3 as well as the cell #4, and when the mobile station UE receives the same DPCHs #1 transmitted from the cell #3 and the cell #4, the mobile station UE is configured to combine the DPCH #1 received from the cell #3 and the DPCH#1 received from the cell #4, so as to determine the increase/decrease of the transmission power of the DPCH #1 in both of the cell #3 and the cell #4, based on the reception power of the combined DPCH #1.

Then, the mobile station UE is configured to transmit the determined result of the increase/decrease of the transmission power of the DPCH #1 to the both of the cell #3 and the cell #4, using the TPC command.

In addition, in the above mobile communication system, the transmission power of the E-HICH #1 transmitted from the cell #3 is configured to be determined, based on the transmission power of the DPCH #1 transmitted from the cell #3 and the predetermined offset (the E-HICH offset).

In addition, the transmission power of the E-HICH #2 transmitted from the cell #4 is configured to be determined, based on the transmission power of the DPCH #1 transmitted from the cell #4 and the predetermined offset (the E-HICH offset).

Further, as shown in FIG. 4B, in the above mobile communication system, if the mobile station UE is performing the SHO by establishing the radio links with the cell #3 as well as the cell #4, and if the reception power of the DPCH #1 transmitted from the cell #3 is good enough, even when the reception power of the DPCH #1 transmitted from the cell #4 is insufficient, the reception power of the combined DPCH #1 will be sufficient for the mobile station UE.

Therefore, in the above mobile communication system, the mobile station UE can receive the DPCH#1, if the reception power of the DPCH #1 transmitted from the cell #3 is good enough, even when the reception power of the DPCH #1 transmitted from the cell #4 is insufficient.

Accordingly, in such a condition, the transmission power of the DPCH #1 does not have to be increased, and the mobile station UE is configured not to transmit the TPC command (for example, UP command) for increasing the transmission power of the DPCH #1 transmitted from the cell #4.

However, in the above condition, as shown in FIG. 5, the transmission power of the E-HICH #2 transmitted from the cell #4 is depending on the transmission power of the DPCH #1 transmitted from the cell #4, so that the reception power of the E-HICH #2 will be insufficient, when the reception power of the DPCH #1 transmitted from the cell #4 is insufficient in the mobile station UE.

Therefore, in the above mobile communication system, when the mobile station UE is performing the SHO by establishing the radio links with the cell #3 as well as the cell #4, the mobile station UE can receive the E-HICH #1 transmitted from the cell #3, however the mobile station UE cannot receive the E-HICH #2 transmitted from the cell #4.

Accordingly, in the case as shown in FIG. 5, there has been a problem that the mobile station UE can receive the E-HICH #1 (NACK) and the mobile station UE can not receive the E-HICH #2 (ACK), even when the cell #3 transmits the E-HICH #1 (NACK) in response to the E-DPDCH #1 transmitted from the mobile station UE, and the cell #4 transmits the E-HICH #2 (ACK) in response to the E-DPDCH #1 transmitted from the mobile station UE.

Therefore, in such a case, the mobile station UE does not transmit the subsequent uplink user data, but the mobile station UE retransmits the E-DPDCH #1 to the cell #4 unnecessarily.

BRIEF SUMMARY OF THE INVENTION

The present invention has been made considering the problems, and its object is to provide a transmission power control method and a mobile communication system, in which E-HICHs can be certainly reached to a mobile station UE, even when the mobile station UE is performing the soft-handover.

A first aspect of the present invention is summarized as a transmission power control method for controlling a transmission power of a transmission acknowledgement channel for uplink user data which is transmitted from a cell controlled by a radio base station to a mobile station, including: notifying, from a radio network controller to at least one radio base station controlling a first cell and a second cell, offsets between the transmission power of the transmission acknowledgement channel and a transmission power of a dedicated physical channel, when a mobile station is performing a soft-handover with the first cell and the second cell; determining, at the first cell, a transmission power of a first transmission acknowledge channel based on a notified offset, and transmitting the first transmission acknowledge channel to the mobile station using the determined transmission power; and determining, at the second cell, transmission power of a second transmission acknowledge channel based on a notified offset, and transmitting the second transmission acknowledge channel to the mobile station using the determined transmission power.

In the first aspect, the radio network controller can be configured to notify, to at least one radio base station controlling the first cell and the second cell, the offsets between the transmission power of the transmission acknowledgement channel and the transmission power of the dedicated physical channel, when the mobile station is not performing a soft-handover with the first cell and the second cell.

A second aspect of the present invention is summarized as a mobile communication system for controlling transmission power of a transmission acknowledgement channel for uplink user data which is transmitted from a cell controlled by a radio base station to a mobile station; wherein a radio network controller is configured to notify, to at least one radio base station controlling a first cell and a second cell, offsets between a transmission power of a transmission acknowledgement channel and a transmission power of a dedicated physical channel, when a mobile station is performing a soft-handover with the first cell and the second cell; the first cell is configured to determine a transmission power of a first transmission acknowledge channel based on a notified offset, and to transmit the first transmission acknowledge channel to the mobile station using the determined transmission power, and the second cell is configured to determine a transmission power of a second transmission acknowledge channel based on a notified offset, and to transmit the second transmission acknowledge channel to the mobile station using the determined transmission power.

BRIEF DESCRIPTION OF THE SEVERAL VIEWS OF THE DRAWINGS

FIG. 18 is a sequence diagram showing an example of a transmission power control method according to the first embodiment of the present invention.

FIG. 19 is a sequence diagram showing an example of the transmission power control method according to the first embodiment of the present invention.

DETAILED DESCRIPTION OF THE INVENTION

Configuration of Mobile Communication System According to First Embodiment of the Present Invention Referring to FIGS. 6 to 17, a configuration of a mobile communication system according to a first embodiment of the present invention will be described.

It should be noted that, the mobile communication system according to this embodiment is designed in order to increase a communication performance such as a communication capacity, a communication quality and the like. Further, the mobile communication system according to this embodiment can be applied to "W-CDMA" and "CDMA2000" of the third generation mobile communication system.

Figure 6:
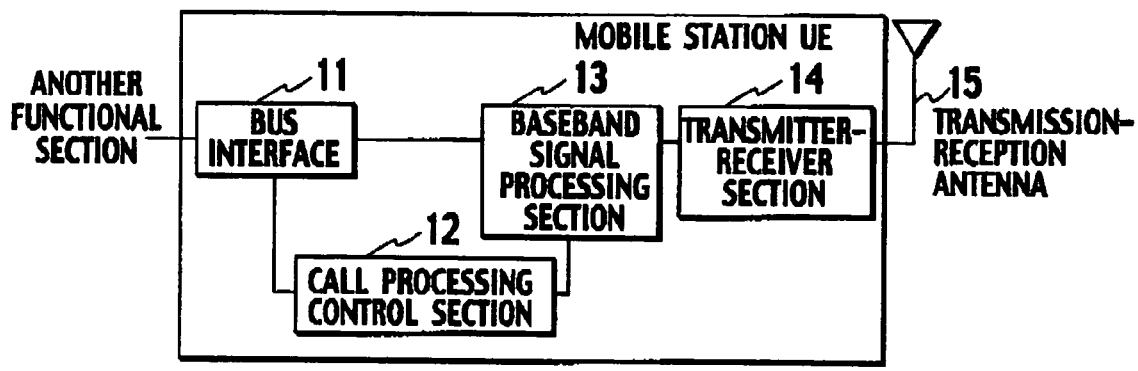
FIG. 6 is a functional block diagram of a mobile station in the mobile communication system according to the first embodiment of the present invention.

An example of general configuration of a mobile station UE according to this embodiment is shown in FIG. 6.

Figure 1:
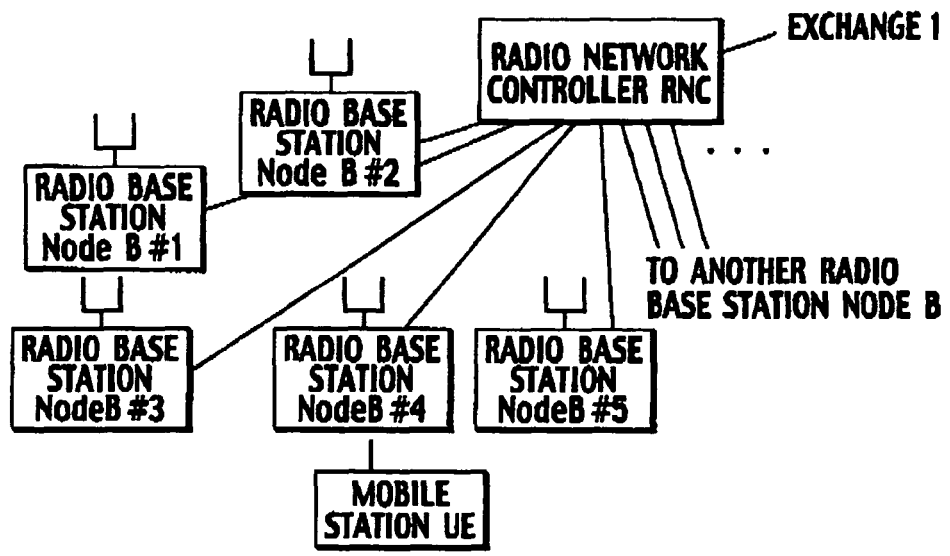
FIG. 1 is diagram of an entire configuration of a general mobile communication system.
Figure 2A:
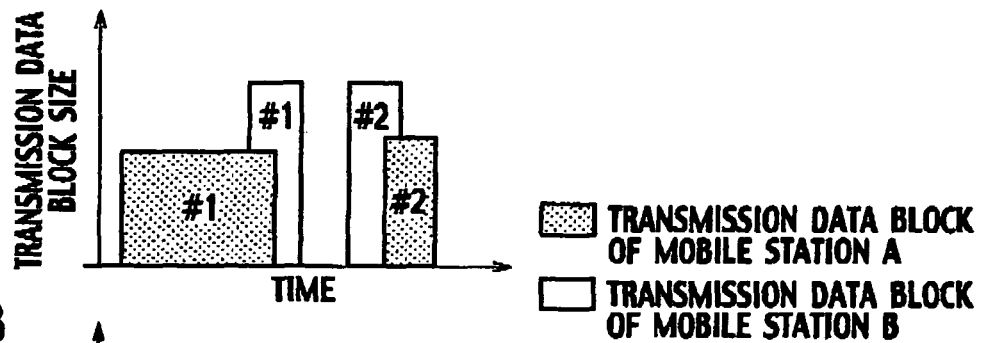
FIGS. 2A to 2C are diagrams for explaining a method for controlling a transmission power in a conventional mobile communication system.
Figure 2B:
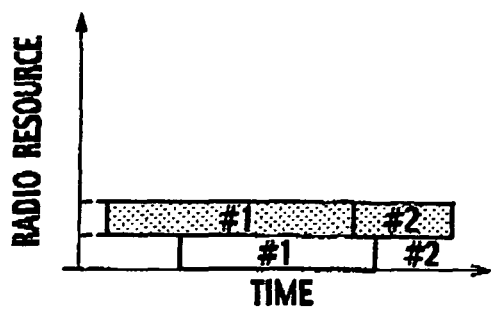
Figure 2C:
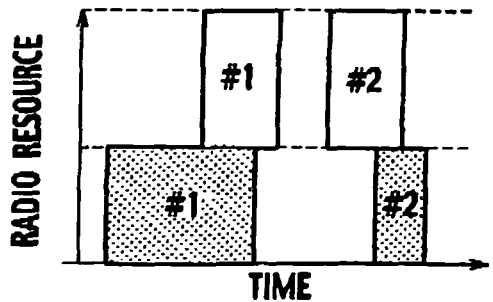
Figure 3:
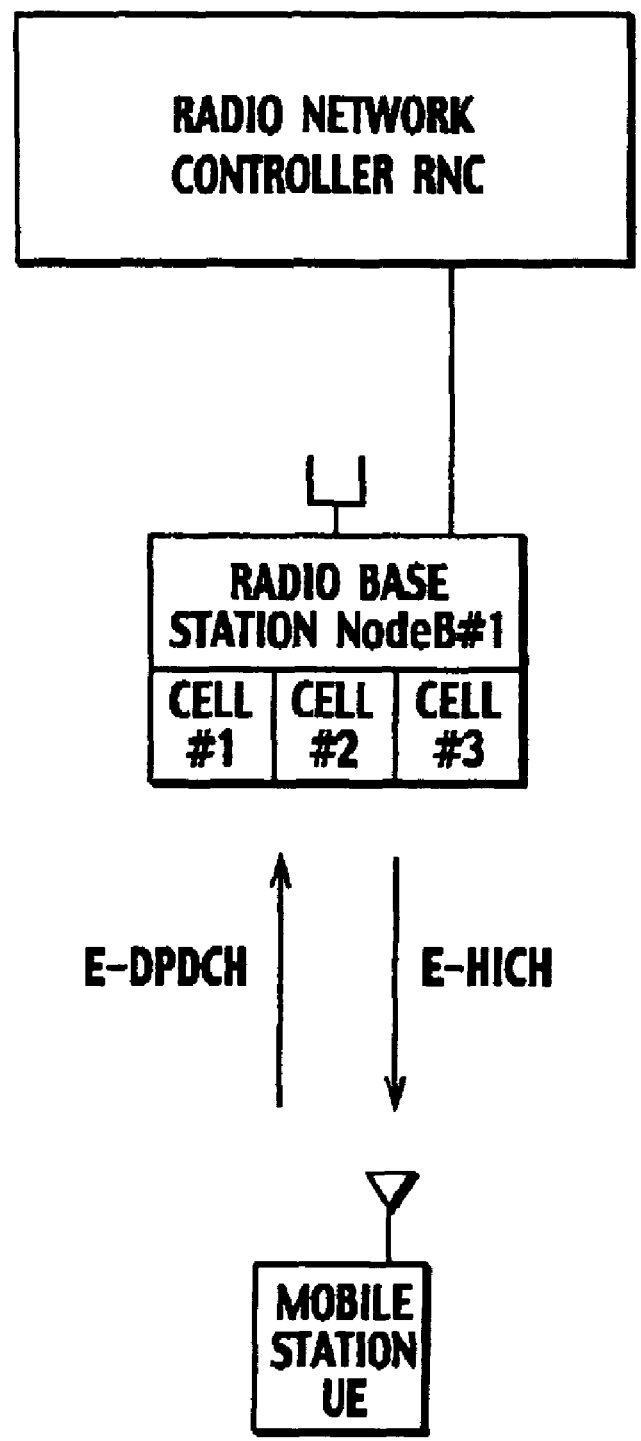
FIG. 3 is a diagram of an entire configuration of the conventional mobile communication system.
Figure 4A:
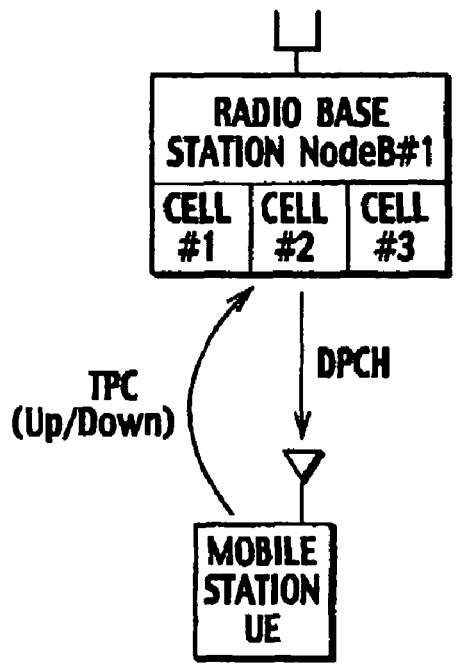
FIGS. 4A and 4B are diagrams for explaining a transmission power control method in the conventional mobile communication system.
Figure 4B:
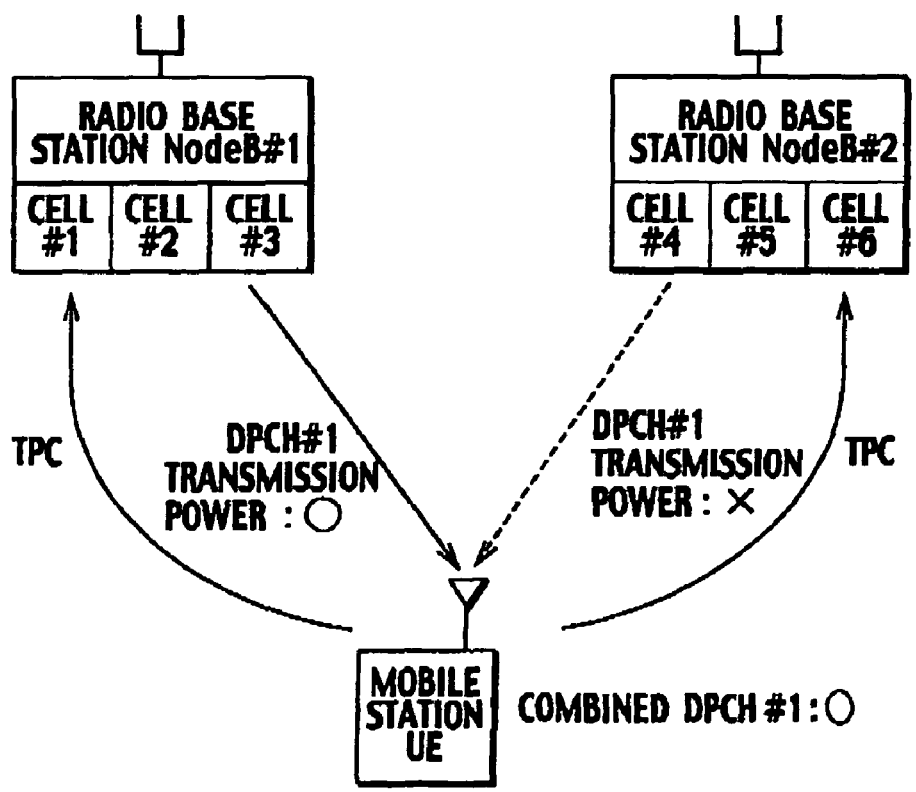
Figure 5:
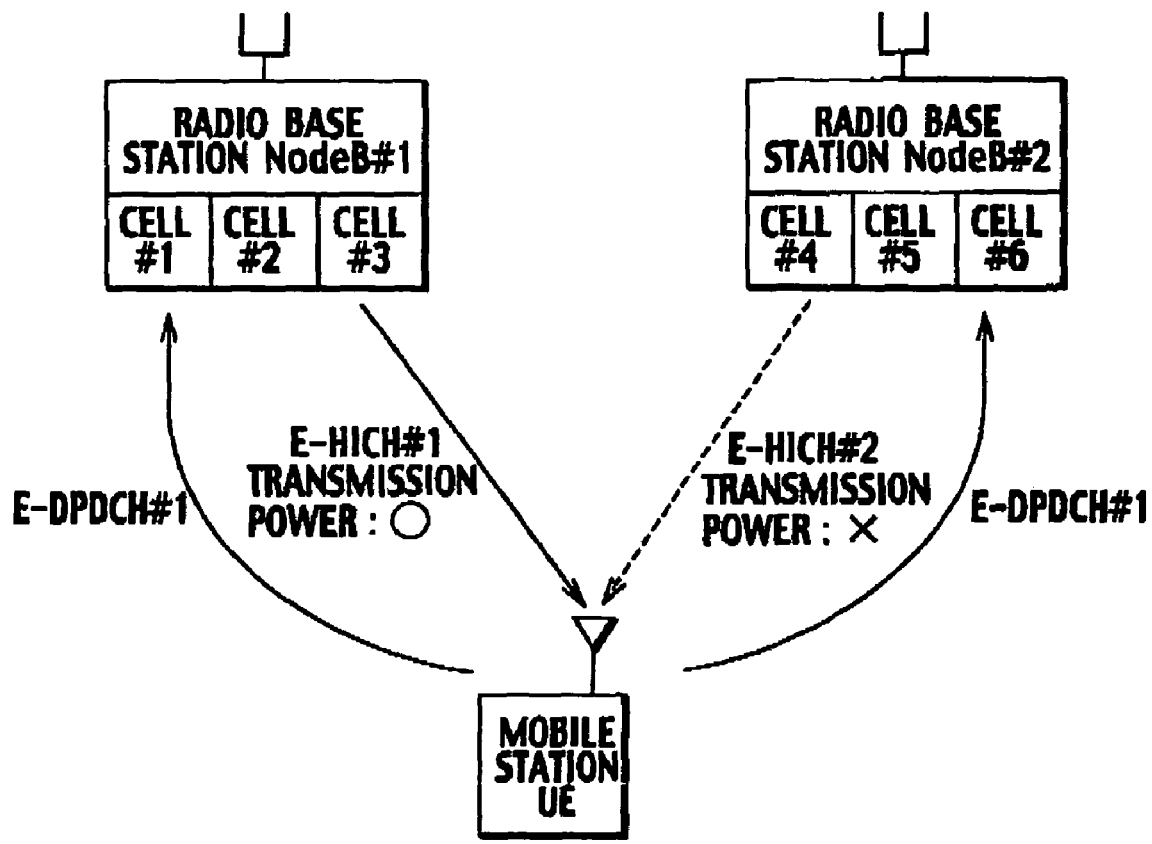
FIG. 5 is a diagram for explaining the transmission power control method in the conventional mobile communication system.

As shown in FIG. 6, the mobile station UE is provided with a bus interface 11, a call processing control section 12, a baseband signal processing section 13, a transmitter-receiver section 14, and a transmission-reception antenna 15. In addition, the mobile station UE can be configured to include an amplifier section (not shown in FIG. 4).

However, these functions do not have to be independently present as hardware. That is, these functions can be partly or entirely integrated, or can be configured through a process of software.

Figure 7:
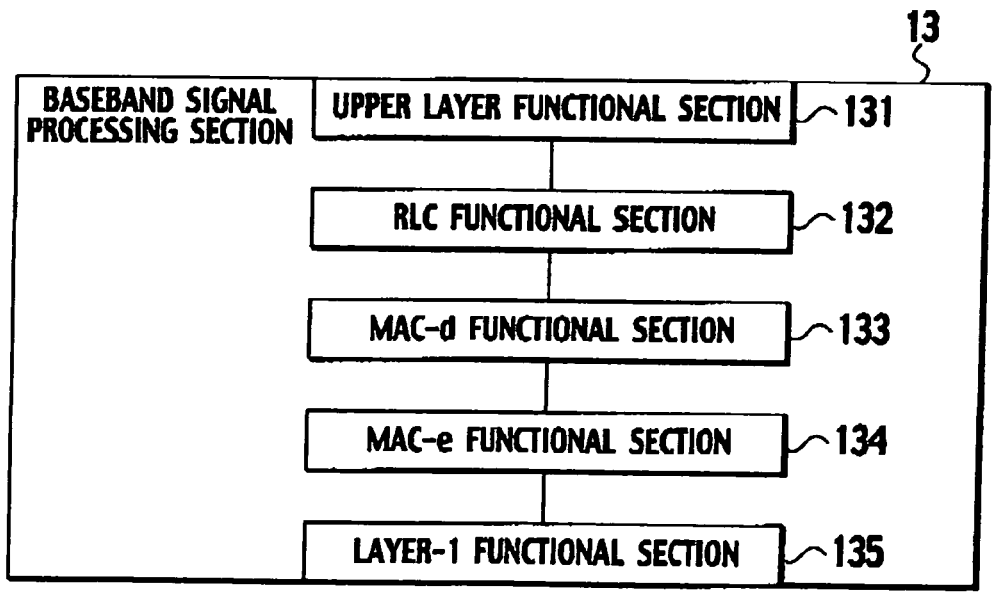
FIG. 7 is a functional block diagram of a baseband signal processing section of the mobile station in the mobile communication system according to the first embodiment of the present invention.

In FIG. 7, a functional block of the baseband signal processing section 13 is shown.

As shown in FIG. 7, the baseband signal processing section 13 is provided with an upper layer functional section 131, a RLC functional section 132, a MAC-d functional section 133, a MAC-e functional section 134, and a layer-1 functional section 135.

The RLC functional section 132 is configured to work as a RLC sublayer. The layer-1 functional section 135 is configured to work as a layer-1.

Figure 8:
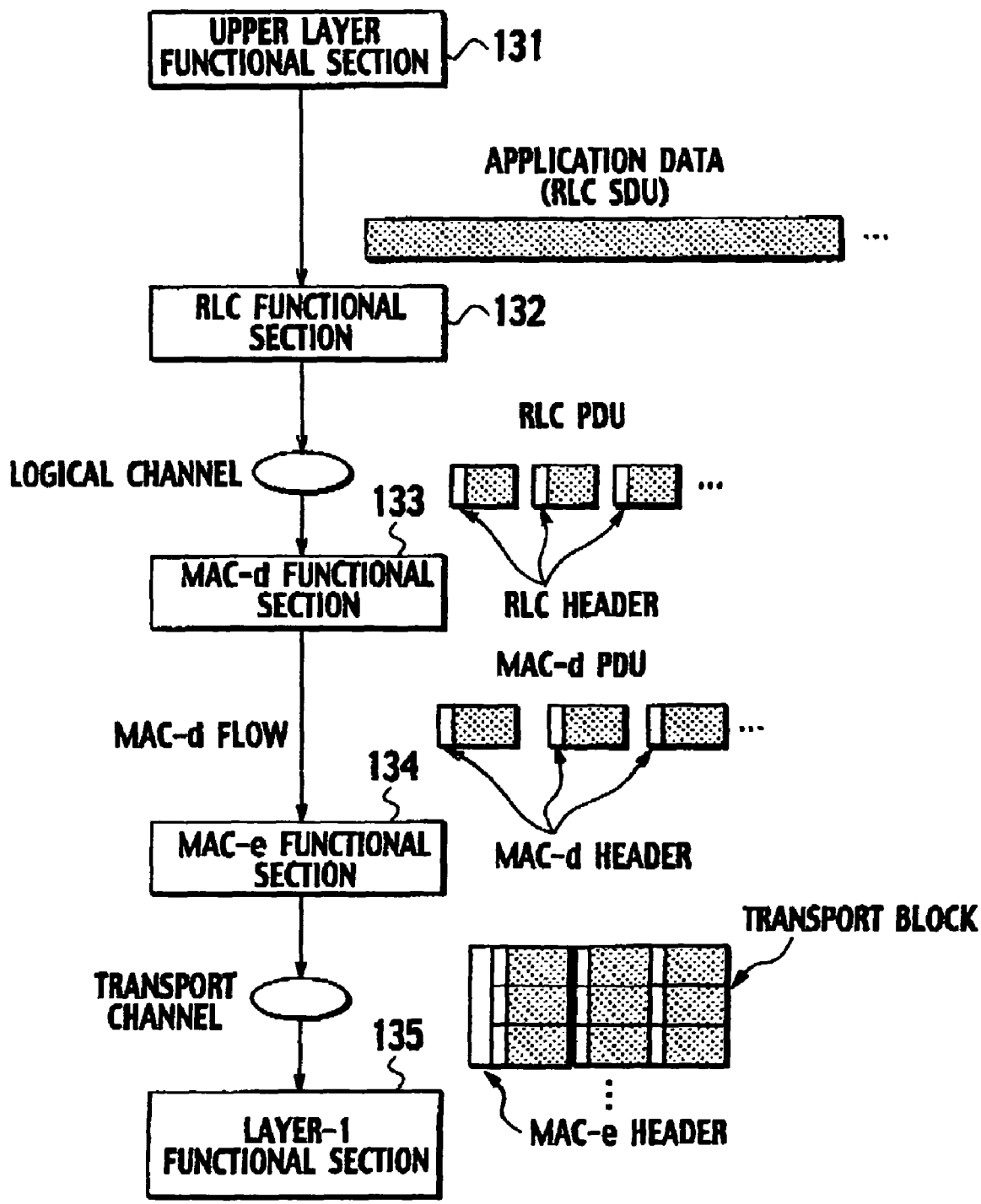
FIG. 8 is a diagram for explaining functions of the baseband signal processing section of the mobile station in the mobile communication system according to the first embodiment of the present invention.

As shown in FIG. 8, the RLC functional section 132 is configured to divide an application data (RLC SDU), which is received from the upper layer functional section 131, into PDUs of a predetermined PDU size. Then, the RLC functional section 132 is configured to generate RLC PDUs by adding a RLC header used for a sequence control processing, retransmission processing, and the like, so as to pass the RLC PDus to the MAC-d functional section 133.

Here, a pipeline works as a bridge between the RLC functional section 132 and the MAC-d functional section 133 is a "logical channel" The logical channel is classified based on the contents of data to be transmitted/received, and when a communication is performed, it is possible to establish a plurality of logical channels in one connection. In other words, when the communication is performed, it is possible to transmit/receive a plurality of data with different contents (for example, control data and user data, or the like) logically in parallel.

The MAC-d functional section 133 is configured to multiplex the logical channels, and to add a MAC-d header associated with the multiplex of the logical channels, so as to generate a MAC-d PDU. A plurality of MAC-d PDUs are transferred from the MAC-d functional section 133 to the MAC-e functional section 134 as MAC-d flow.

The MAC-e functional section 134 is configured to assemble a plurality of MAC-d PDUs which are received from the MAC-d functional section 133 as MAC-d flow, and to add a MAC-e header to the assembled MAC-d PDU, so as to generate a transport block. Then, the MAC-e functional section 134 is configured to pass the generated transport block to the layer-1 functional section 135 through a transport channel.

In addition, the MAC-e functional section 134 is configured to work as a lower layer of the MAC-d functional section 133, and to implement the retransmission control function according to Hybrid ARQ (HARQ) and the transmission rate control function.

Figure 9:
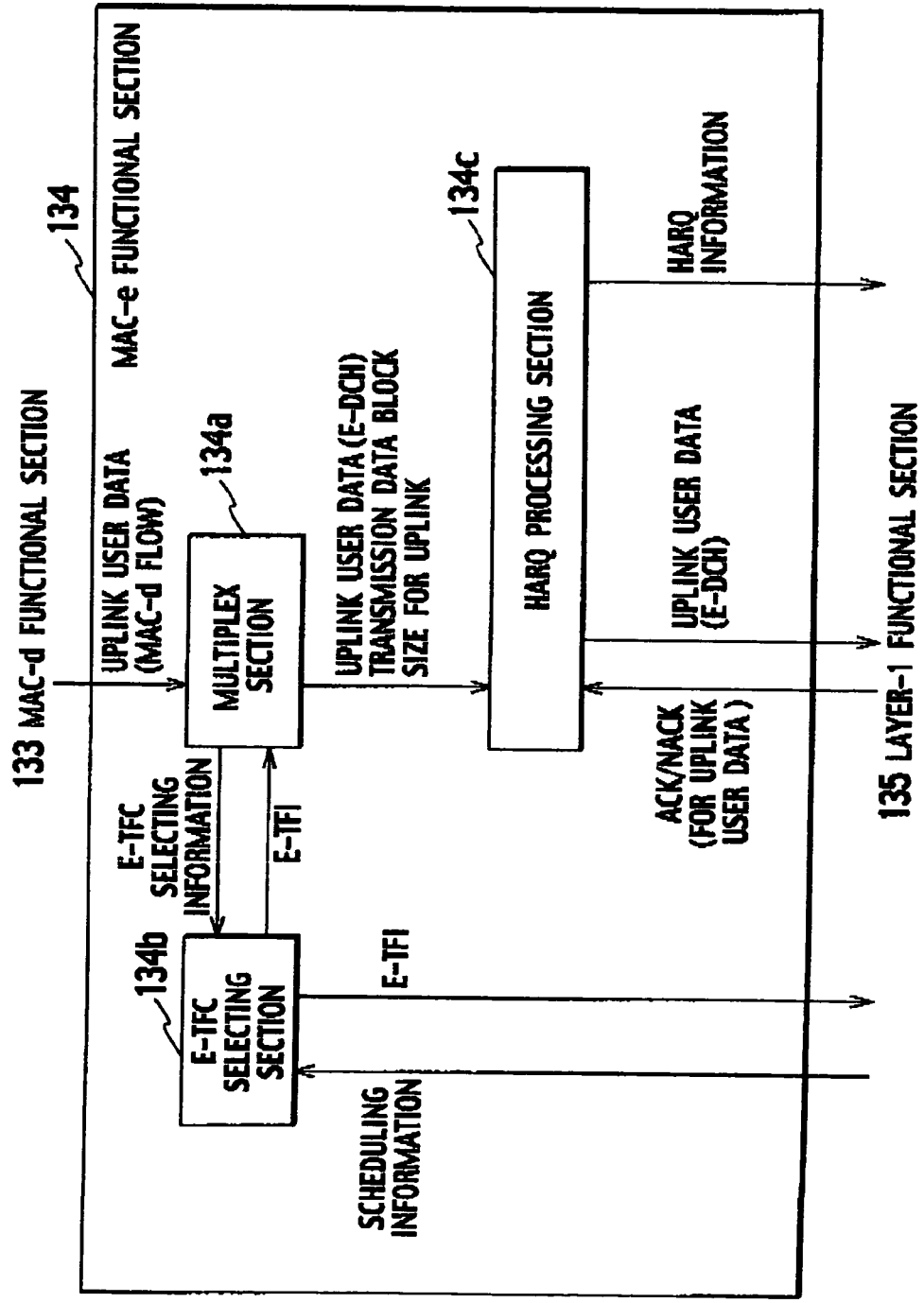
FIG. 9 is a functional block diagram of a MAC-e functional section in the baseband signal processing section of the mobile station in the mobile communication system according to the first embodiment of the present invention.

Specifically, as shown in FIG. 9, the MAC-e functional section 134 is provided with a multiplex section 134a, an E-TFC electing section 134b, and an HARQ processing section 134c.

The multiplex section 134a is configured to perform a multiplex processing to the uplink user data, which is received from the MAC-d functional section 133 as MAC-d flow, based on a "Enhanced—Transport Format Indicator (E-TFI)" notified from the E-TFC selecting section 134b, so as to generate uplink user data (a Transport Block) to be transmitted via a transport channel (E-DCH). Then, the multiplex section 134a is configured to transmit the generated uplink user data (Transport Block) to the HARQ processing section 134c.

Hereinafter, the uplink user data received as MAC-d flow is indicated as the "uplink user data (MAC-d flow)", and the uplink user data to be transmitted via the transport channel (E-DCH) is indicated as the "uplink user data (E-DCH)".

The E-TFI is an identifier of a transport format, which is a format for providing the transport block on the transport channel (E-DCH) per TTI, and the E-TFI is added to the MAC-e header.

The multiplex section 134a is configured to determine a transmission data block size to be applied for the uplink user data based on the E-TFI notified from the E-TFC selecting section 134b, and to notify the determined transmission data block size to the HARQ processing section 134c.

In addition, when the multiplex section 134a receives the uplink user data from the MAC-d functional section 133 as MAC-d flow, the multiplex section 134a is configured to notify, to the B-TFC selecting section 134b, E-TFC selecting information for selecting a transport format for the received uplink user data.

Here, the E-TFC selecting information includes data size and priority class of the uplink user data, or the like.

Figure 10:
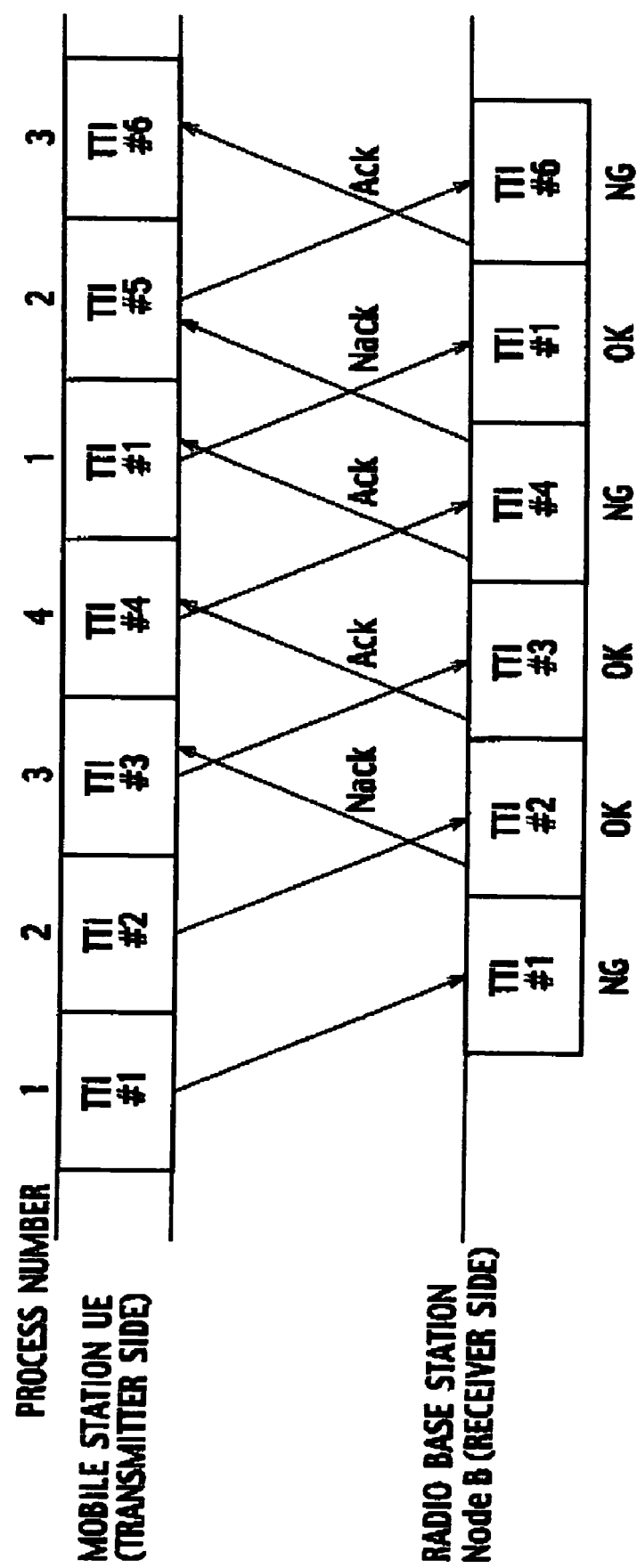
FIG. 10 is a graph illustrating an operation of four channel stop and wait protocol performed by an HARQ processing section in the MAC-e functional section in the baseband signal processing section of the mobile station in the mobile communication system according to the first embodiment of the present invention.

The HARQ processing section 134c is configured to perform the retransmission control processing for the "uplink user data (E-DCH)" according to the "N channel stop and wait (N-SAW) protocol", based on ACK/NACK for the uplink user data notified from the layer-1 functional section 135. An example for operations of the "4 channel stop and wait protocol" is shown in FIG. 10.

In addition, the HARQ processing section 134c is configured to transmit, to the layer-1 functional section 135, the "uplink user data (E-DCH)" received from the multiplex section 134a, and HARQ information (for example, a number for retransmission, and the like) used for the HARQ processing.

The E-TFC selecting section 134b is configured to determine the transmission rate of the uplink user data by selecting the transport format (E-TF) to be applied to the "uplink user data (E-DCH)".

Specifically, the E-TFC selecting section 134b is configured to determine whether the transmission of the uplink user data should be performed or stopped, based on scheduling information, the amount of data in MAC-d PDU, the condition of hardware resource of the radio base station Node B, and the like.

The scheduling information (such as absolute transmission rate and a relative transmission rate of the uplink user data) is received from the radio base station Node B, the amount of data in MAC-d PDU (such as data size of the uplink user data) is passed from the MAC-d functional section 133, and the condition of hardware resource of the radio base station Node B is controlled in the MAC-e functional section 134.

Then, the E-TFC selection section 134b is configured to select the transport format (E-TF) to be applied to transmission of the uplink user data, and to notify the E-TFI for identifying the selected transport format to the layer-1 functional section 135 and the multiplex section 134a.

For example, the E-TFC selecting section 134b is configured to store the transmission rate of uplink user data in association with the transport format, to update the transmission rate of uplink user data based on the scheduling information from the layer-1 functional section 135, and to notify, to the layer-1 functional section 135 and the multiplex section 134a, the E-TFI for identifying the transport format which is associated with the updated transmission rate of uplink user data.

Here, when the E-TFC selecting section 134b receives the absolute transmission rate of the uplink user data from the serving cell for the mobile station UE via the E-AGCH as the scheduling information, the E-TFC selecting section 134b is configured to change the transmission rate of the uplink user data to the received absolute transmission rate of the uplink user data.

In addition, when the E-TFC selecting section 134b receives the relative transmission rate of the uplink user data (UP command or DOWN command) from the non-serving cell for the mobile station UE via the E-RGCH as the scheduling information, the E-TPC selecting section 134b is configured to increase/decrease the transmission rate of the uplink user data, at the timing of receiving the relative transmission rate, by the predetermined rate based on the relative transmission rate of the uplink user data.

In this specification, the transmission rate of the uplink user data can be a rate which can transmit an uplink user data via an "Enhanced Dedicated Physical Data Channel (E-DPDCH)", a transmission data block size (TBS) for transmitting an uplink user data, a transmission power of an "E-DPDCH", or a transmission power ratio (a transmission power offset) between an "E-DPDCH" and a "Dedicated Physical Control Channel (DPCCH)".

Figure 11:
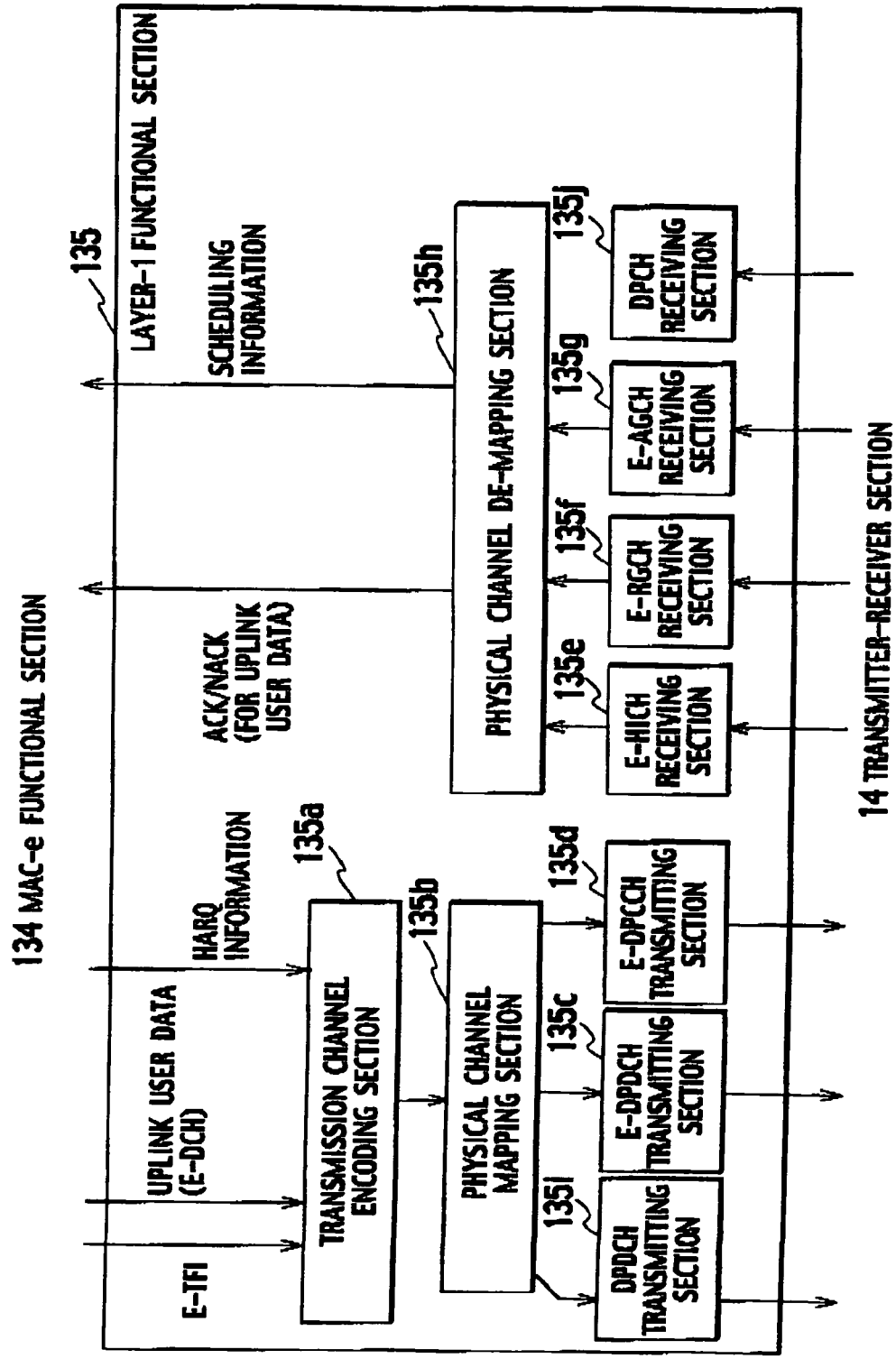
FIG. 11 is a functional block diagram of a layer-1 functional section in the baseband signal processing section of the mobile station in the mobile communication system according to the first embodiment of the present invention.

As shown in FIG. 11, the layer-1 functional section 135 is provided with a transmission channel encoding section 135a, a physical channel mapping section 135b, an E-DPDCH transmitting section 135c, an E-DPCCH transmitting section 135d, an E-HICH receiving section 135e, an E-RGCH receiving section 135f, an E-AGCH receiving section 135g, a physical channel de-mapping section 135h, a DPDCH transmitting section 135i, a DPCCH transmitting section (not shown), and a DPCH receiving section 135j.

Figure 12:
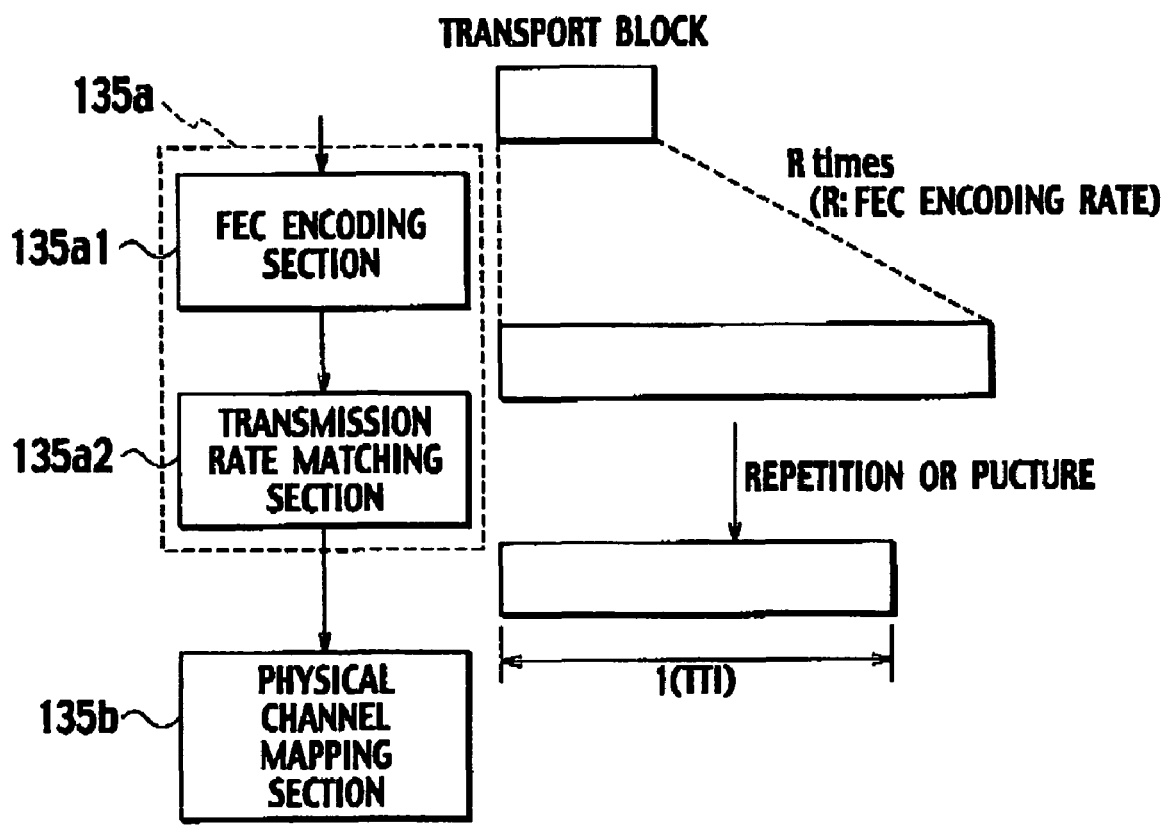
FIG. 12 is a diagram for explaining functions of the layer-1 functional section in the baseband signal processing section of the mobile station in the mobile communication system according to the first embodiment of the present invention.

As shown in FIG. 12, the transmission channel encoding section 135a is provided with a FEC (Forward Error Correction) encoding section 135a1, and a transmission rate matching section 135a2.

As shown in FIG. 12, the FEC encoding section 135a1 is configured to perform the error correction encoding processing toward the "uplink user data (E-DCH)", that is, the transport block, transmitted from the MAC-e functional section 134.

In addition, as shown in FIG. 12, the transmission rate matching section 135a2 is configured to perform, toward the transport block to which the error correction encoding processing is performed, the processing of "repetition (repeat of bit)" and "puncture (bit skipping)" in order to match to the transmission capacity in the physical channel.

The physical channel mapping section 135b is configured to pair the "uplink user data (E-DCH)" from the transmission channel encoding section 135a with the E-DPDCH, and to pair the E-TFI and the HARQ information from the transmission channel encoding section 135a with the E-DPCCH.

The E-DPDCH transmitting section 135c is configured to perform a transmission processing of the E-DPDCH.

The E-DPCCH transmitting section 135d is configured to perform a transmission processing of the E-DPCCH.

The E-HICH receiving section 135e is configured to receive an "E-DCH HARQ Acknowledgement Indicator Channel (E-HICH)" transmitted from the radio base station Node B.

The E-RGCH receiving section 135f is configured to receive the E-RGCH transmitted from the radio base station Node B (the serving cell and the non-serving cell for the mobile station UE).

The E-AGCH receiving section 135g is configured to receive the E-AGCCH transmitted from the radio base station Node B (the serving cell for the mobile station UE).

The physical channel de-mapping section 135h is configured to extract the ACK/NACK for the uplink user data which is included in the E-HICH received by the E-HICH receiving section 135e, so as to transmit the extracted ACK/NACK for the uplink user data to the MAC-e functional section 134.

In addition, the physical channel de-mapping section 135h is configured to extract the scheduling information (the relative transmission rate of the uplink user data, that is, Down command/Don't care command) which is included in the E-RGCH received by the E-RGCH receiving section 135f, so as to transmit the extracted scheduling information to the MAC-e functional section 134.

In addition, the physical channel de-mapping section 135h is configured to extract the scheduling information (the absolute transmission rate of the uplink user data) which is included in the E-AGCH received by the E-AGCH receiving section 135g, so as to transmit the extracted scheduling information to the MAC-e functional section 134.

The DPDCH transmitting section 135i is configured to perform a transmission processing of a "Dedicated Physical Data Channel (DPDCH)" for uplink user data. The DPDCH is used for transmitting the uplink user data to be transmitted by the mobile station UE.

Here, the above uplink user data includes a measurement report, which reports transmission power of a common pilot channel transmitted from the cell.

The DPCH receiving section 135j is configured to perform a receive processing of a "Dedicated Physical Data Channel (DPCH)" for a downlink user data transmitted from the radio base station Node B.

Here, the DPCH includes a "Dedicated Physical Data Channel (DPDCH)" and a "Dedicated Physical Control Channel (DPCCH)".

Figure 13:
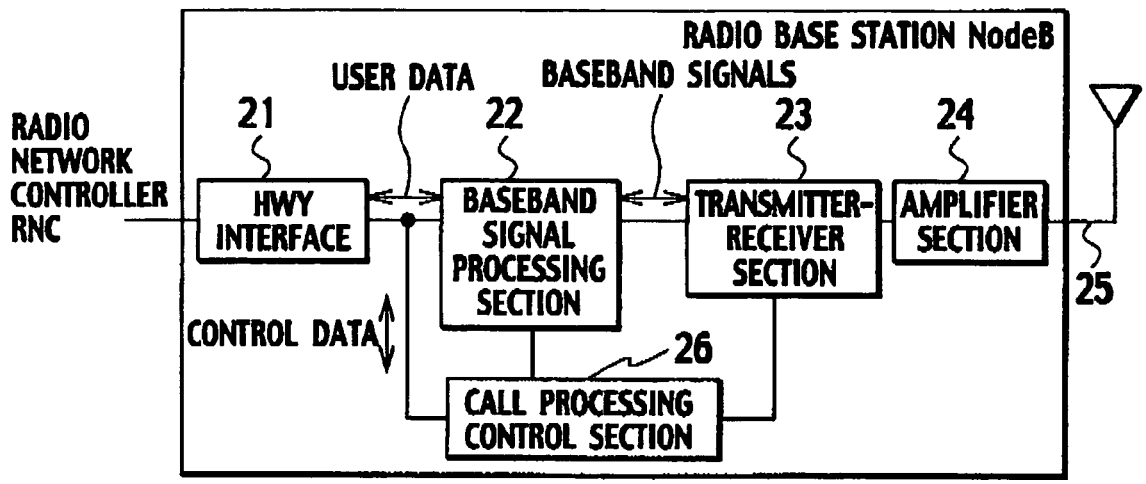
FIG. 13 is a functional block diagram of a radio base station according to the first embodiment of the present invention.

FIG. 13 shows an example of a configuration of functional blocks of a radio base station Node B according to this embodiment.

As shown in FIG. 13, the radio base station Node B according to this embodiment is provided with an HWY interface 21, a baseband signal processing section 22, a transmitter-receiver section 23, an amplifier section 24, a transmission-reception antenna 25, and a call processing control section 26.

The HWY interface 21 is configured to receive downlink user data to be transmitted from the radio network controller RNC, which is located in an upper level of the radio base station Node B, so as to enter the received downlink user data to the baseband signal processing section 22.

In addition, the HWY interface 21 is configured to transmit uplink user data from the baseband signal processing section 22 to the radio network controller RNC.

The baseband signal processing section 22 is configured perform the layer-1 processing such as channel encoding processing, spreading processing, and the like, to the downlink user data, so as to transmit the baseband signal including the downlink user data to the transmitter-receiver section 23.

In addition, the baseband signal processing section 22 is configured to perform the layer-1 processing such as despreading processing, RAKE combining processing, error correction decoding processing, and the like, to the baseband signal, which is acquired from the transmitter-receiver section 23, so as to transmit the acquired uplink user data to the HWY interface 21.

The transmitter-receiver section 23 is configured to convert the baseband signal, which is acquired from the baseband signal processing section 22, to radio frequency signals.

In addition, the transmitter-receiver section 23 is configured to convert the radio frequency signals, which are acquired from the amplifier section 24, to the baseband signals.

The amplifier section 24 is configured to amplify the radio frequency signals acquired from the transmitter-receiver section 23, so as to transmit the amplified radio frequency signals to the mobile station UE via the transmission-reception antenna 25.

In addition, the amplifier section 24 is configured to amplify the signals received by the transmission-reception antenna 25, so as to transmit the amplified signals to the transmitter-receiver section 23.

The call processing control section 26 is configured to transmit/receive the call processing control signals to/from the radio network controller RNC, and to perform the processing of condition control of each function in the radio base station Node B, allocating hardware resource in layer-3, and the like.

Figure 14:
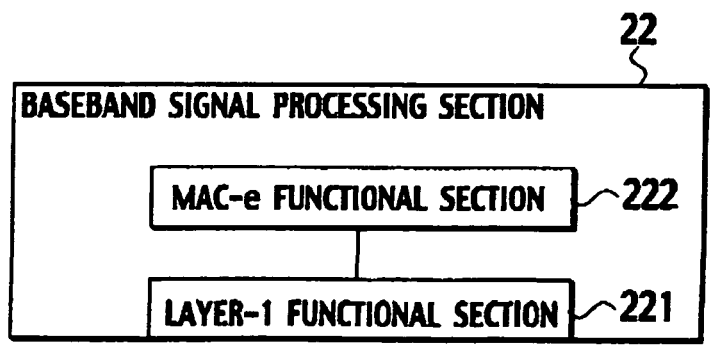
FIG. 14 is a functional block diagram of a baseband signal processing section in the radio base station of the mobile communication system according to the first embodiment of the present invention.

FIG. 14 is a functional block diagram of the baseband signal processing section 22.

As shown in FIG. 14, the baseband signal processing section 22 is provided with a layer-1 functional section 221, and a MAC-e functional section 222.

Figure 15:
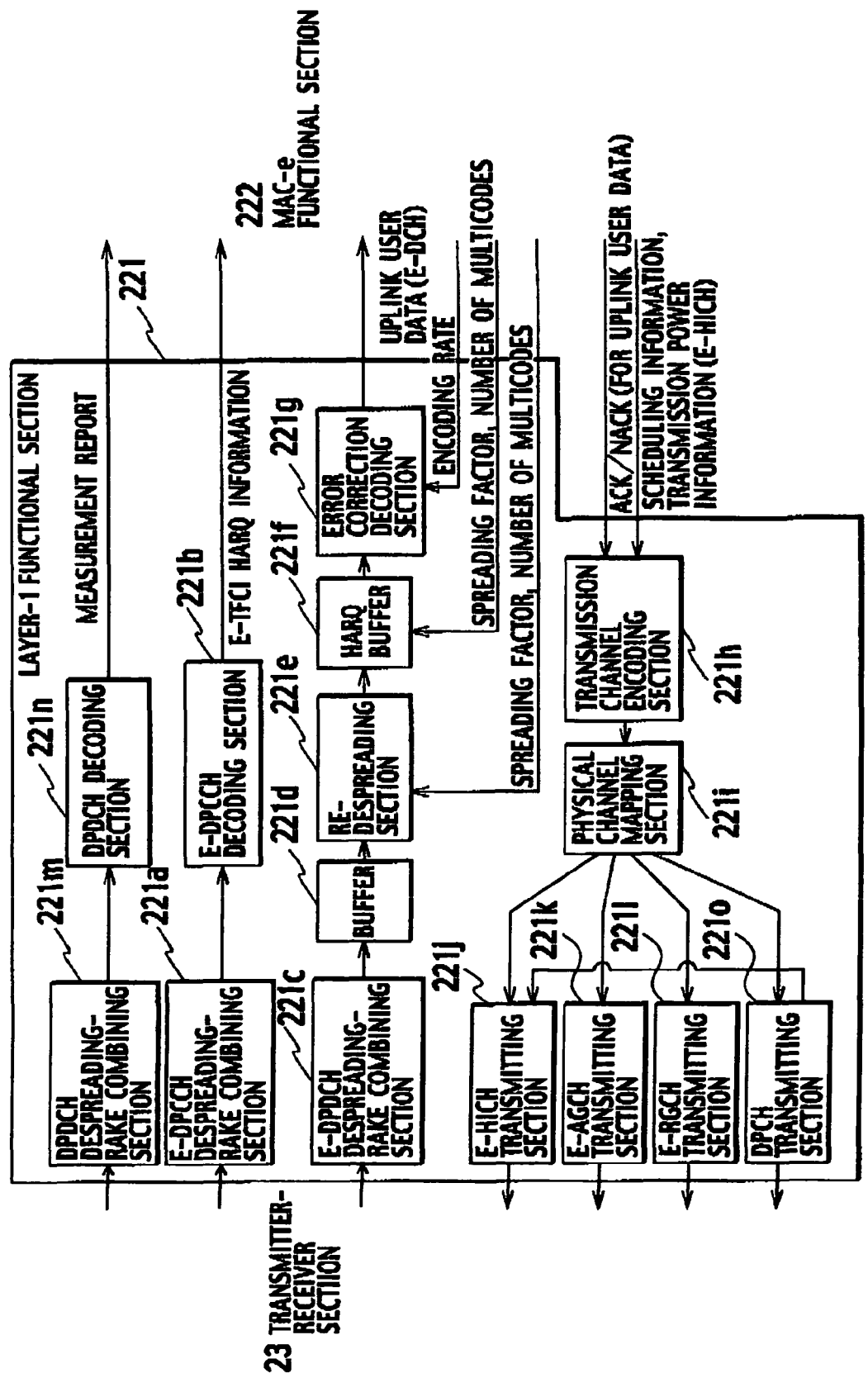
FIG. 15 is a functional block diagram of a layer-1 functional section in the baseband signal processing section in the radio base station of the mobile communication system according to the first embodiment of the present invention.

As shown in FIG. 15, the layer-1 functional section 221 is provided with an E-DPCCH despreading-RAKE combining section 221a, an E-DPCCH decoding section 221b, an E-DPDCH despreading-RAKE combining section 221c, a buffer 221d, a re-despreading section 221e, an HARQ buffer 221f, an error correction decoding section 221g, a transmission channel encoding section 221h, a physical channel mapping section 221i, an E-HICH transmitting section 221j, an E-AGCH transmitting section 221k, an E-RGCH transmitting section 221l, a DPDCH transmitting section 221m, a DPDCH decoding section 221n, a DPCCH transmitting section (not shown), a DPCCH decoding section (not shown), and a DPCH transmitting section 221o.

However, these functions do not have to be independently present as hardware. That is, these functions can be partly or entirely integrated, or can be configured through a process of software.

The E-DPCCH despreading-RAKE combining section 221a is configured to perform the despreading processing and RAKE combining processing to the E-DPCCH.

The E-DPCCH decoding section 221*b* is configured to decode the E-TFCI for determining the transmission rate of the uplink user data (or an "Enhanced Transport Format and Resource Indicator (E-TFRI)" based on the output from the E-DPCCH despreading-RAKE combining section 221*a*, so as to transmit the decoded E-TFCI to the MAC-e functional section 222.

The E-DPDCH despreading-RAKE combining section 221*c* is configured to perform the despreading processing to the E-DPDCH using the spreading factor (the minimum spreading factor) and the number of multi-codes which correspond to the maximum rate that the E-DPDCH can use, so as to store the despread data to the buffer 221*d*. By performing the despreading processing using the above described spreading factor and the number of multi-codes, it is possible for the radio base station Node B to reserve the resources so that the radio base station Node B can receive the uplink data up to the maximum rate (bit rate) that the mobile station UE can use.

The re-despreading section 221*e* is configured to perform the re-despreading processing to the data stored in the buffer 221*d* using the spreading factor and the number of multi-codes which are notified from the MAC-e functional section 222, so as to store the re-despread data to the HARQ buffer 221*f*.

The error correction decoding section 221*g* is configured to perform the error correction decoding processing to the data stored in the buffer 221*d* based on the coding rate which is notified from the MAC-e functional section 222, so as to transmit the acquired "uplink user data (E-DCH)" to the MAC-e functional section 222.

The transmission channel encoding section 221*h* is configured to perform the necessary encoding processing to the ACK/NACK and the scheduling information for the uplink user data received from the MAC-e functional section 222.

The physical channel mapping section 221*i* is configured to pair the ACK/NACK for the uplink user data, which is acquired from the transmission channel encoding section 221*h*, with the E-HICH, to pair the scheduling information (absolute transmission rate), which is acquired from the transmission channel encoding section 221*h*, with the E-AGCH, and to pair the scheduling information (relative transmission rate), which is acquired from the transmission channel encoding section 221*h*, with the E-RGCH.

The E-HICH transmitting section 221*j* is configured to perform a transmission processing of the E-HICH.

In addition, the E-HICH transmitting section 221*j* is configured to determine the transmission power of the E-HICH, based on a first E-HICH offset or a second E-HICH offset, which are notified from the scheduling section 222*c*, and the transmission power of the downlink DPCH, and to transmit the E-HICH using the determined transmission power.

To be more specific, the E-ITCH transmitting section 221*j* is configured to acquire the transmission power of the downlink DPCH from the DPCH transmitting section 221*o*, and to multiply or add the first E-HICH offset or the second E-HICH offset, which are notified from the scheduling section 222*c*, to the transmission power of downlink DPCH, so as to determine the transmission power of the B-HICH.

The E-AGCH transmitting section 221*k* is configured to perform a transmission processing to the E-AGCH.

The E-RGCH transmitting section 221*l* is configured to perform a transmission processing to the E-RGCH.

The DPDCH despreading-RAKE combining section 221*m* is configured to perform the despreading processing and the RAKE combining processing to the DPDCH.

The DPDCH decoding section 221*n* is configured to decode the uplink user data transmitted from the mobile station UE, based on the output from the DPDCH despreading-RAKE combining section 221*m*, so as to transmit the decoded uplink user data to the MAC-e functional section 222.

Here, the above uplink user data includes a measurement report, which reports reception power of a common pilot channel transmitted from the mobile station UE.

The DPCH transmitting section 221*o* is configured to perform a transmission processing to a "Dedicated Physical Channel (DPCH)" for downlink transmitted from the radio base station Node B.

In addition, the DPCH transmitting section 221*o* is configured to notify the transmission power of the downlink DPCH to the E-HICH transmitting section 221*j*.

Figure 16:
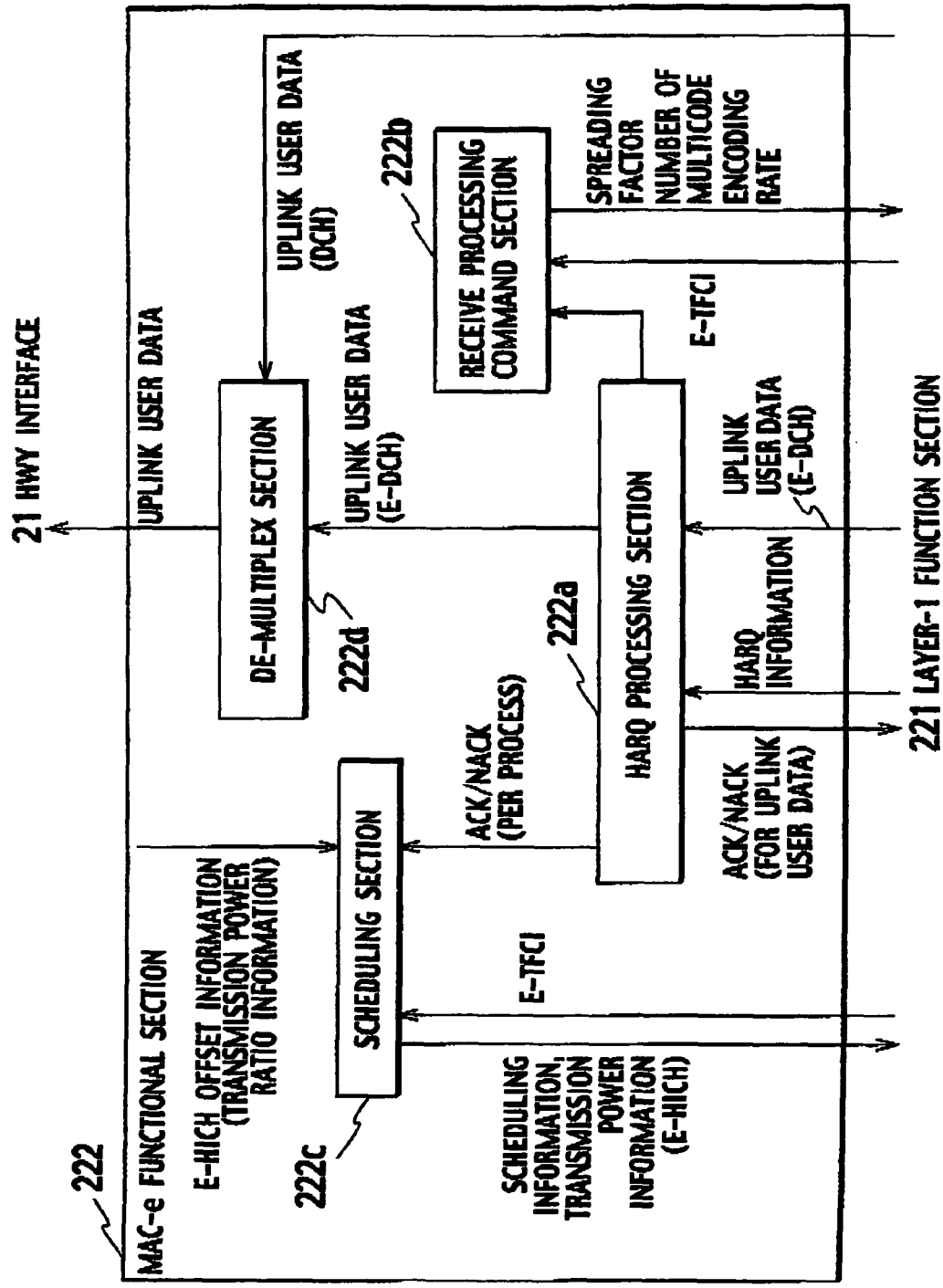
FIG. 16 is a functional block diagram of a MAC-e functional section in the baseband signal processing section in the radio base station of the communication system according to the first embodiment of the present invention.

As shown in FIG. 16, the MAC-e functional section 222 is provided with an HARQ processing section 222*a*, a receive processing command section 222*b*, a scheduling section 222*c*, and a de-multiplex section 222*d*.

The HARQ processing section 222*a* is configured to receive the uplink user data and the HARQ information which are received from the layer-1 functional section 221, so as to perform the HARQ processing on the "uplink user data (E-DCH)".

In addition, the HARQ processing section 222*a* is configured to notify, to the layer-1 functional section 221, the ACK/NACK (for the uplink user data) which shows the result of receive processing on the "uplink user data (E-DCH)".

In addition, the HARQ processing section 222*a* is configured to notify, to the scheduling section 222*c*, the ACK/NACK (for the uplink user data) per process.

The receive processing command section 222*b* is configured to notify, to the re-despreading section 221*e* and the HARQ buffer 221*f*, the spreading factor and the number of multi-codes for the transport format of each mobile station UE, which is specified by the E-TFCI per TTI received from the E-DPCCH decoding section 221*b* in the layer-1 functional section 221. Then, the receive processing command section 222*b* is configured to notify the encoding rate to the error correction decoding section 221*g*.

The scheduling section 222*c* is configured to change the absolute transmission rate or the relative transmission rate of the uplink user data, based on the B-TFCI per TTI received from the E-DPCCH decoding section 221 in the layer-1 functional section 221, the ACK/NACK per process received from the HARQ processing section 222*a*, the interference level, and the like.

In addition, the scheduling section 222*c* is configured to notify, to the layer-1 functional section 221, the absolute transmission rate or the relative transmission rate of the uplink user data, as the scheduling information.

In addition, the scheduling section 222*c* is configured to receive E-HICH offset information which is transmitted from the radio network controller RNC via the HWY interface.

In addition, the scheduling section 222*c* is configured to notify the first E-HICH offset or the second E-HICH offset, which is included in the E-HICH offset information, to the layer-1 functional section 221.

The de-multiplex section 222*d* is configured to perform the de-multiplex processing to the "uplink user data (E-DCH and DCH)" received from the HARQ processing section 222*a*, so as to transmit the acquired uplink user data to the HWY interface 21.

Here, the above uplink user data includes a measurement report, which reports reception power of a common pilot channel transmitted from the mobile station UE.

The radio network controller RNC according to this embodiment is an apparatus located in an upper level of the radio base station Node B, and is configured to control radio communications between the radio base station Node B and the mobile station UE.

Figure 17:
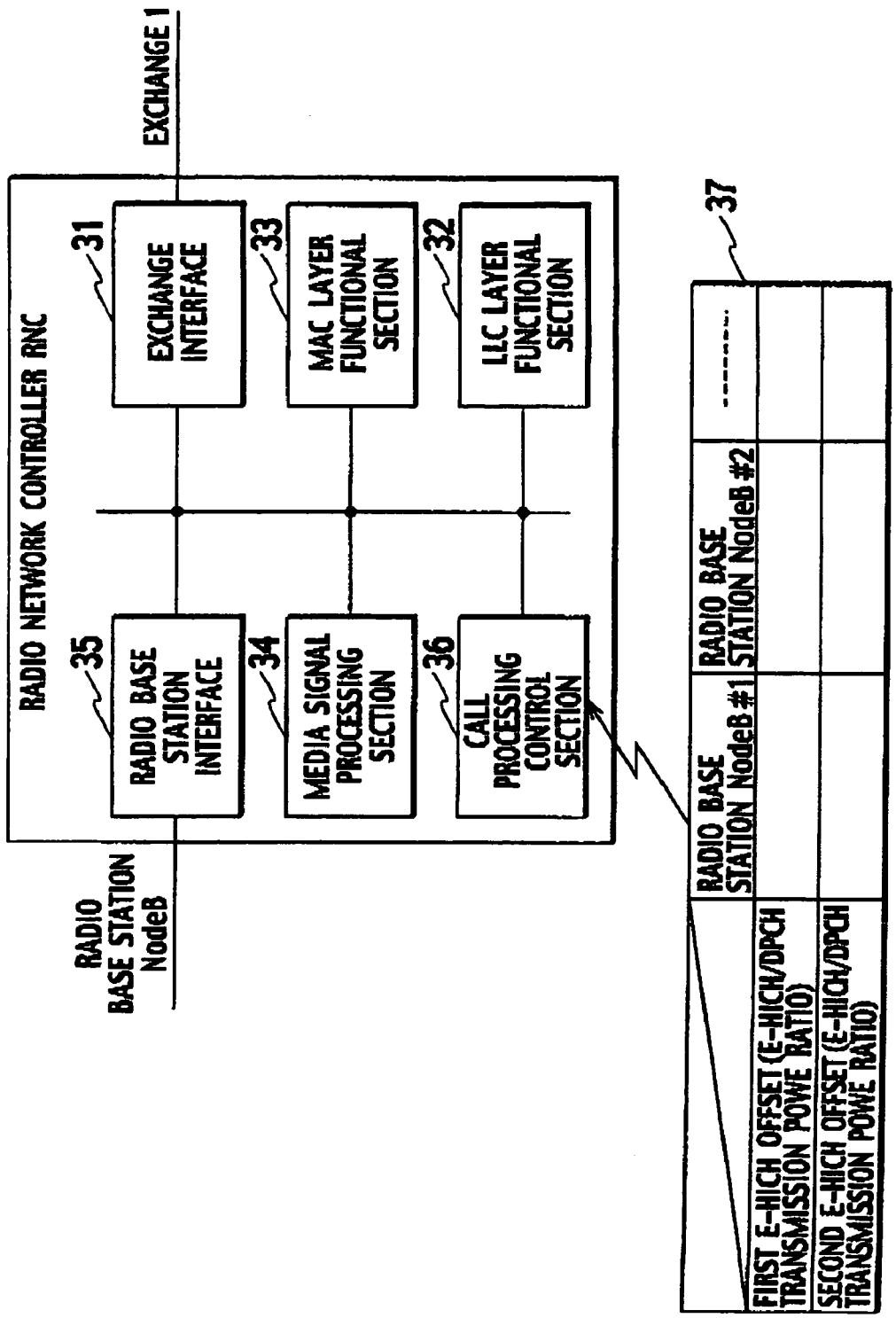
FIG. 17 is a functional block diagram of a radio network controller of the mobile communication system according to the first embodiment of the present invention.

As shown in FIG. 17, the radio network controller RNC according to this embodiment is provided with an exchange interface 31, a Logical Link Control (LLC) layer processing section 32, a MAC layer functional section 33, a media signal processing section 34, a radio base station interface 35, and a call processing control section 36.

The exchange interface 31 is an interface with an exchange 1, and is configured to forward the downlink signals transmitted from the exchange 1 to the LLC layer functional section 32, and to forward the uplink signals transmitted from the LLC layer functional section 32 to the exchange 1.

The LLC layer functional section 32 is configured to perform an LLC sub-layer processing such as a combining processing of a header or a trailer such as a sequence pattern number.

The LLC layer functional section 32 is also configured to transmit the uplink signals to the exchange interface 31 and to transmit the downlink signals to the MAC layer functional section 33, after the LLC sub-layer processing is performed.

The MAC layer functional section 33 is configured to perform a MAC layer processing such as a priority control processing or a header adding processing.

The MAC layer functional section 33 is also configured to transmit the uplink signals to the LLC layer functional section 32 and to transmit the downlink signals to the radio base station interface 35 (or the media signal processing section 34), after the MAC layer processing is performed.

The media signal processing section 34 is configured to perform a media signal processing against voice signals or real time image signals.

The media signal processing section 34 is also configured to transmit the uplink signals to the MAC layer functional section 33 and to transmit the downlink signals to the radio base station interface 35, after the media signal processing is performed.

The radio base station interface 35 is an interface with the radio base station Node B. The radio base station interface 35 is configured to forward the uplink signals transmitted from the radio base station Node B to the MAC layer functional section 33 (or the media signal processing section 34) and to forward the downlink signals transmitted from the MAC layer functional section 33 (or the media signal processing section 34) to the radio base station Node B.

The call processing control section 36 is configured to perform a radio resource control processing, a channel setup and release processing by the layer-3 signaling, or the like. Here, the radio resource control includes call admission control, handover control, or the like.

In addition, the call processing control section 36 is configured to notify the E-HICH offset information to the radio base station Node B via the radio base station interface 35.

In addition, as shown in FIG. 17, the call control section 36 is configured to store a transmission power ratio between the E-HICH and the DPCH, as the first E-HICH offset 37 or the second E-HICH offset 37.

Further, the call processing control section 36 is configured to generate the E-HICH offset information which includes the second E-HICH offset, when the mobile station UE is performing the SHO, by establishing the radio links with a plurality of cells.

Furthermore, the call processing control section 36 is configured to generate the E-HICH offset information which includes the first E-HICH offset, when the mobile station UE is not performing the SHO, and is establishing the radio link with one cell.

The radio links according to this embodiment includes the DPCH or the E-DPDCH between the mobile station UE and the radio base station Node B.

Therefore, in this embodiment, the state in which the mobile station UE is establishing the radio link with one cell is indicated as "a Non-SHO state", and the state in which the mobile station UE is establishing the radio links with a plurality of cells is indicated as "a SHO state".

Each of the first E-HICH offset and the second E-HICH offset is the transmission power ratio between the E-HICH and the DPCH, and it is configured that the second E-HICH offset should be greater than the first E-HICH offset.

Operations of Mobile Communication System According to First Embodiment of the Present Invention Referring to FIGS. 18 and 19, operations of the mobile communication system according to this embodiment will be described.

Specifically, the operations of controlling a transmission power of a transmission acknowledgement channel (E-HICH) for uplink user data in the mobile communication system according to this embodiment will be described.

Here, in this embodiment, examples where a radio base station Node B is configured to control one or a plurality of cells, the cells include the functions of the radio base station Node B will be described.

As a first example, operation of controlling a transmission power of an B-HICH by a cell #10, when a mobile station UE is shifting from the Non-SHO state, where the radio link with only the cell #10 in established, to the SHO state, where the radio links with the cell #10 as well as a cell #20 are established, will be described.

In this embodiment, it can be configured that both of cell #10 and cell #20 are controlled by a same single radio base station Node B, or the each of cell #10 and cell #20 is controlled by different radio base stations Node B.

As shown in FIG. 18, in step S1001, the mobile station UE is establishing a data connection for transmitting uplink user data with the radio network controller RNC via the cell #10.

In this case, the cell #10 is configured to determine the transmission power of the E-HICH, based on the transmission power of the DPCH and the first E-HICH offset.

To be more specific, the cell #10 is configured to multiply or add the first E-HICH offset which is included in the E-HICH offset information transmitted from the radio network controller RNC in advance, to the DPCH to which the closed loop transmission power control is performed, so as to determine the transmission power of the E-HICH.

In step S1002, when the reception power of the common pilot signal from the cell #20 become more than or equal to the predetermined value, the mobile station UE transmits a measurement report to the radio network controller RNC.

In step S1003, the radio network controller RNC requests the radio base station Node B #2 which controls the cell #20 to establish synchronization of radio links for uplink between the mobile station UE and the cell #20, based on the transmitted measurement report.

To be more specific, the radio network controller RNC transmits a SHO setting request to the radio base station Node #2 which controls the cell #20, so as to request to establish synchronization of the radio links for uplink between the mobile station UE and the cell #20.

The SHO setting request includes a channelization code for identifying the channel configuration in the radio link, and a scrambling code for identifying the mobile station UE.

In step S1004, the radio base station Node B #2 which controls the cell #20 establishes the synchronization of the radio links for uplink between the mobile station UE and the cell #20.

To be more specific, in the radio link for uplink, the radio base station Node B #2 which controls the cell #20 detects the channel transmitted by the mobile station UE using the channelization code and the scrambling code received from the radio network controller RNC, so as to establish the synchronization of the radio links for uplink between the mobile station UE and the cell #20.

When the synchronization of the radio links for uplink between the mobile station UE and the cell #20 is established, the radio base station Node B #2 which controls the cell #20 transmits a SHO setting response to the radio network controller RNC. In addition, in the downlink, the cell #20 starts the transmission of the DPCH and the like to the mobile station UE.

In step S1005, the radio network controller RNC requests the mobile station UE to establish synchronization of radio links for downlink between the cell #20 and the mobile station UE.

To be more specific, the radio network controller RNC transmits a SHO setting request to the mobile station UE, so as to request to establish the synchronization of radio links or downlink between the cell #20 and the mobile station UE.

Here, the SHO setting request includes a channelization code for identifying the channel configuration in the radio link for downlink, and a scrambling code for identifying the cell #20.

In step S1006, the mobile station UE establishes the synchronization of radio links for downlink between the cell #20 and the mobile station UE.

To be more specific, in the radio link for downlink, the mobile station UE detects the channel transmitted from the cell #20 using the channelization code and the scrambling code received from the radio network controller RNC, so as to establish the synchronization of the radio links for downlink between the cell #20 and the mobile station UE.

When the synchronization of the radio links for downlink between the cell #20 and the mobile station UE is established, the mobile station UE transmits a SHO setting response to the radio network controller RNC.

In step S1007, the radio network controller RNC transmits the E-HICH offset information including the second E-HICH offset, to the radio base station Node B #1 which controls the cell #10 and the radio base station Node B #2 which controls the cell #20.

The E-HICH offset information may be transmitted to the radio base station Node B #2 which controls the cell #20, by the SHO setting request.

In step S1008, the cell #10 and the cell #20 determine the transmission power of the E-HICH, based on the second E-HICH offset which is included in the E-HICH offset information transmitted from the radio network controller RNC.

Here, the second E-HICH offset transmitted from the radio network controller RNC is set to be greater than the first E-HICH offset.

Accordingly, when the mobile station UE, i.e., the destination of the E-HICH, is performing the SHO, the cell #10 sets the E-HICH offset greater, and to increase the transmission power of the E-HICH, so as to ensure the transmission of the E-HICH to the mobile station UE which is performing the SHO.

As a second example, operation of controlling the transmission power of the E-HICH by the cell #10, when the mobile station UE is shifting from the SHO state, where the radio links with the cell #10 as well as a cell #20 are established, to the Non-SHO state, where the radio link with only the cell #10 is established, will be described.

As shown in FIG. 19, in step S2001, when the reception power of the common pilot signal from the cell #20 become less than the predetermined value, the mobile station UE transmits a measurement report to the radio network controller RNC.

In step S2002, the radio network controller RNC requests the radio base station Node B #2 which controls the cell #20 to release the radio links for uplink between the mobile station UE and the cell #20, based on the transmitted measurement report.

In addition, the radio network controller RNC transmits a SHO release request to the mobile station UE, so as to release the radio link for downlink between the cell #20 and the mobile station UE.

In step S2003, the radio network controller RNC transmits the E-HICH offset information including the first E-HICH offset to the radio base station Node B #1.

In step S2004, the cell #10, which has received the E-HICH offset information, determines the transmission power of the E-HICH, based on the first E-HICH offset included in the E-HICH offset information and the transmission power of the downlink DPCH.

Accordingly, when the mobile station UE, i.e., the destination of the E-HICH, is not performing the SHO, the cell #10 is configured to minimize the E-HICH offset in the Non-SHO state appropriately, and to adjust the transmission power of the E-HICH, so as to use the radio network capacity effectively.

In the mobile communication system according to this embodiment, the example that the radio network controller RNC transmits the E-HICH offset information including the second E-HICH offset, when the mobile station UE is performing the SHO, is shown.

However, in the present invention, the radio network controller RNC can be configured to transmit the E-HICH offset information including the second E-HICH offset based on the predetermined notification from the mobile station UE and the cell (for example, a predetermined measurement report from the mobile station UE, and the like).

Effects of Mobile Communication System According to First Embodiment of the Present Invention According to the transmission power control method and the mobile communication system of the present invention, it is possible to transmit the E-HICH to the mobile station UE, even when the mobile station UE is performing the SHO.

In other words, according to the transmission power control method and the mobile communication system of the present invention, when the mobile station UE is performing the SHO, the cell or the radio base station Node B which controls the cell can set the E-HICH offset greater, and increase the transmission power of the E-HICH greater. Therefore, it is possible to ensure the transmission of the E-HICH to the mobile station UE.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission power control method for controlling a transmission power of a transmission acknowledgement channel for uplink user data which is transmitted from a cell controlled by a radio base station to a mobile station, comprising:
  notifying, from a radio network controller to at least one radio base station controlling a first cell and a second cell, offsets between the transmission power of the transmission acknowledgement channel and a transmission power of a dedicated physical channel, when a mobile station is performing a soft-handover with the first cell and the second cell;
  determining, at the first cell, a transmission power of a first transmission acknowledge channel based on a notified offset, and transmitting the first transmission acknowledge channel to the mobile station using the determined transmission power; and
  determining, at the second cell, a transmission power of a second transmission acknowledge channel based on a notified offset, and transmitting the second transmission acknowledge channel to the mobile station using the determined transmission power.

2. The transmission power control method according to claim 1, wherein the radio network controller is configured to notify, to at least one radio base station controlling the first cell and the second cell, the offsets between the transmission power of the transmission acknowledgement channel and the transmission power of the dedicated physical channel, when the mobile station is not performing a soft-handover with the first cell and the second cell.

3. A transmission power control method according to claim 1, wherein a first base station controls the first cell and a second base station controls the second cell.

4. A mobile communication system for controlling transmission power of a transmission acknowledgement channel for uplink user data which is transmitted from a cell controlled by a radio base station to a mobile station; wherein
  a radio network controller is configured to notify, to at least one radio base station controlling a first cell and a second cell, offsets between a transmission power of a transmission acknowledgement channel and a transmission power of a dedicated physical channel, when a mobile station is performing a soft-handover with the first cell and the second cell, the first cell is configured to determine a transmission power of a first transmission acknowledge channel based on a notified offset, and to transmit the first transmission acknowledge channel to the mobile station using the determined transmission power, and
  the second cell is configured to determine a transmission power of a second transmission acknowledge channel based on a notified offset, and to transmit the second transmission acknowledge channel to the mobile station using the determined transmission power.

* * * * *